United States Patent [19]

Iverson et al.

[11] 4,120,280

[45] Oct. 17, 1978

[54] ADJUSTABLE GRILL DEVICE

[75] Inventors: Harold L. Iverson, 1 Live Oak La., Fort Myers, Fla. 33905; Robert M. Lemley, Fort Myers, Fla.

[73] Assignee: Harold L. Iverson, Fort Myers, Fla.; a part interest

[21] Appl. No.: 777,570

[22] Filed: Mar. 14, 1977

[51] Int. Cl.² ..................... A47J 33/00; F16M 11/00; F24B3/00

[52] U.S. Cl. ..................................... 126/30; 248/168

[58] Field of Search .................. 126/30, 25 R, 126/9 R; 248/168

[56] References Cited

U.S. PATENT DOCUMENTS

| 955,140 | 4/1910 | Cronk | 248/168 X |
|---|---|---|---|
| 1,311,302 | 7/1919 | Turner et al. | 126/30 X |
| 1,789,317 | 1/1931 | McLeish | 248/168 |
| 1,896,086 | 2/1933 | Howell | 248/168 X |
| 1,995,489 | 3/1935 | Valasek | 126/30 X |
| 3,152,536 | 10/1964 | Lucas | 126/30 X |
| 4,024,851 | 5/1977 | Boda | 126/9 R |
| 4,043,260 | 8/1977 | LaPour et al. | 126/30 X |

FOREIGN PATENT DOCUMENTS 206,330  11/1939  Switzerland .............................. 126/30

*Primary Examiner*—Irwin C. Cohen
*Attorney, Agent, or Firm*—Clarence A. O'Brien; Harvey B. Jacobson

[57] ABSTRACT

An adjustable grill device having at least three legs connected to a head assembly for being disposed adjustably with respect to one another. Suspended from the head assembly is a grill at one end of a flexible element, the other end of which is attached to one of the legs of the device for selective sliding movement along the leg in order to vary the distance of the grill from the head assembly.

11 Claims, 5 Drawing Figures

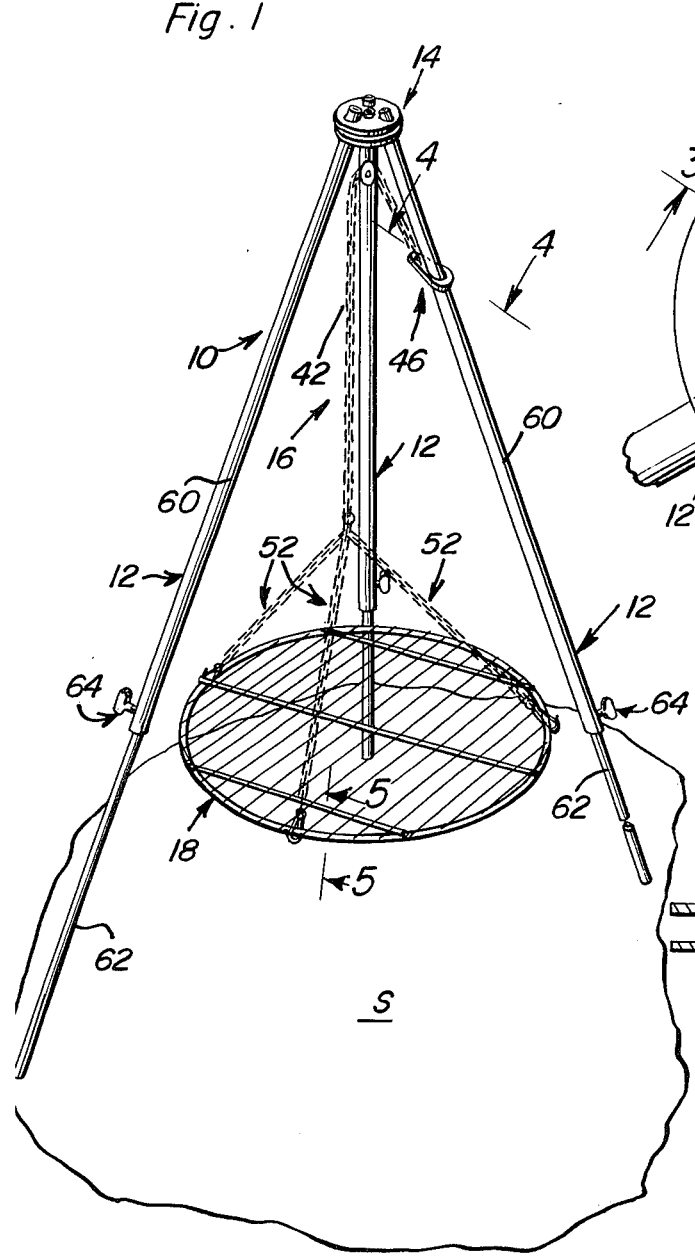
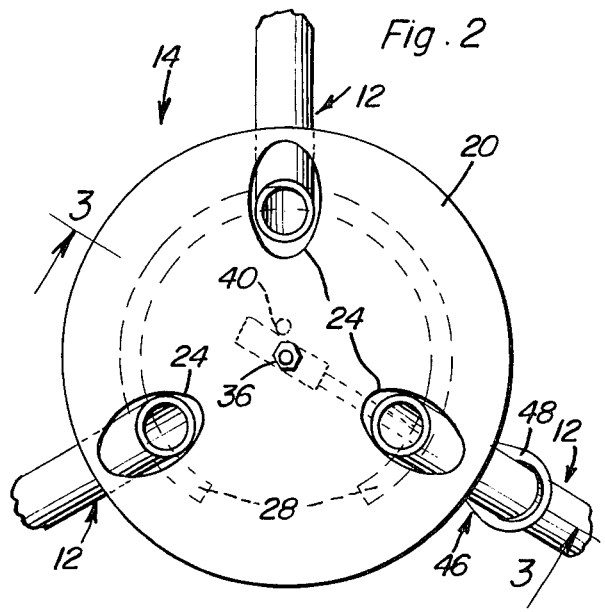
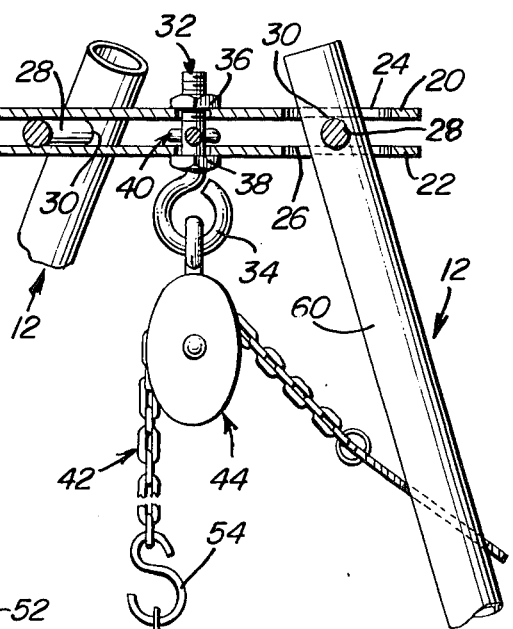
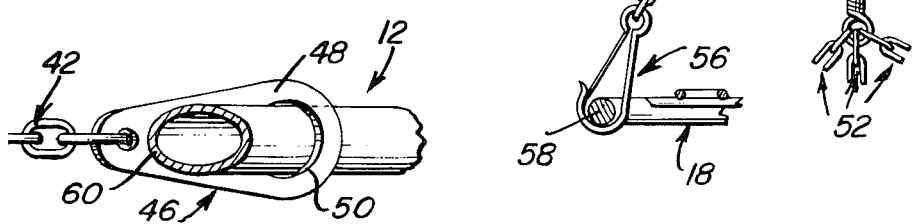

ADJUSTABLE GRILL DEVICE

BACKGROUND OF THE INVENTION

1. Field of the Invention

This invention relates generally to supports for cooking utensils and particularly to a device for adjustably supporting a grill above a fire or other suitable source of heat.

2. Description of the Prior Art

Various devices have been proposed for permitting a cooking utensil to be supported above a camp fire or other suitable source of heat. U.S. Pat. No. 192,011, issued June 12, 1877, to M. T. Richardson, discloses a portable lamp-stove in the form of a tripod device provided with an annular or open cap for receiving a saucepan or other suitable cooking utensil, while U.S. Pat. No. 955,140, issued Apr. 19, 1910, to G. E. Cronk, discloses a camping apparatus wherein a tripod is disposed over a casing adapted to form a fire-box and supporting a top of the casing onn which various cooking utensils can be disposed. Further, U.S. Pat. No. 2,466,496, issued Apr. 5, 1949, to A. T. Smith, discloses an outdoor cooker in which a cooking utensil is held on a chain extending from a plate pivotally connecting together the legs of a tripod device.

U.S. Pat. No. 918,070, issued Apr. 13, 1909, to J. F. Menge, discloses a camper's torch wherein a basket formed of a series of parallel hoops or rings flexibly connected together are supported from a cantilever mounted bracket for holding a fire beneath a cooking utensil also suspended from the bracket.

U.S. Pat. No. 2,465,289, issued Mar. 22, 1949, to P. N. Sitton, discloses tripod construction wherein the three legs of the tripod are hingedly mounted on a tripod head consisting of a hexagonal plate.

SUMMARY OF THE INVENTION

It is an object of the present invention to provide an adjustable grill device of simple, yet rugged and reliable construction.

It is another object of the present invention to provide an adjustable grill device which permits a grill of the device to be moved toward and away from a top portion of the device at which the grill is suspended in a simple, yet reliable manner.

It is yet another object of the present invention to provide an adjustable grill device wherein the supporting legs of the device can be readily adjusted as appropriate to dispose the device over a camp fire or other suitable source of heat.

These and other objects are achieved according to the present invention by providing an adjustable grill device having: at least three legs; a head assembly connected to the legs for disposing the legs adjustably with respect to one another; and a support arrangement mounted on the head assembly for suspending a cooking utensil, such as a grill, beneath the head assembly.

The head assembly advantageously includes first and second substantially parallel, planar plates spaced from one another and provided with a plurality of matching holes, with the number of holes provided being the same as the number of legs provided. The latter are disposed in the holes for adjustment relative to the plane of the plates, with the plates being circular in plan and the holes being elongated, and preferably elliptical, radially of the plates. The legs are retained in the holes provided in the plates as by a substantially C-shaped cotter pin disposed between the plates and arranged in openings provided in the portions of the legs themselves disposed between the plates. A fastener, preferably in the form of an eyebolt, is connected to the plate so as to extend between them and hold the plates together in cooperation with a pair of nuts arranged on the respective outer surfaces of the plates.

The eye of the eyebolt is advantageously disposed beneath the pair of plates, and the support arrangement includes a longitudinally extending, flexible element, such as a chain, having a pair of longitudinally spaced ends. One of these ends is adjustably attached to one of the legs of the device and suspended by the eye of the eyebolt, while the cooking utensil is removably attached to the other of the ends of the flexible element. A slide lock member including a planar element is connected to the one of the ends of the flexible element and is provided with an aperture slidably receiving the associated one of the legs. The planar element thus slides relative to the leg when substantially parallel thereto by appropriate dimensioning of the aperture in the planar element, but the planar element is locked against sliding movement relative to the leg when the planar element is disposed at an angle substantially less then 90 degrees relative to the longitudinal extent of the leg.

The legs are each preferably comprised by a pair of telescoping sections, with clamps associated with the sections for releasably holding the sections in a desired relationship.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view showing an adjustable grill device according to the present invention.

FIG. 2 is an enlarged, fragmentary, top plan view showing the top portion of the device as seen in FIG. 1.

FIG. 3 is a fragmentary, sectional view taken generally along the line 3—3 of FIG. 2.

FIG. 4 is an enlarged, fragmentary, sectional view taken generally along the line 4—4 of FIG. 1.

FIG. 5 is an enlarged, fragmentary, sectional view taken generally along the line 5—5 of FIG. 1.

DESCRIPTION OF THE PREFERRED EMBODIMENTS

Referring now more particularly to FIG. 1 of the drawings, an adjustable grill device 10 according to the present invention includes at least three legs 12 pivotally connected to a head assembly 14 so that the legs 12 are disposed adjustably with respect to one another. A support arrangement 16 is mounted on the head assembly 14 for suspending a cooking utensil, such as grill 18, beneath the head assembly 14.

Referring now more particularly to FIGS. 2 and 3 of the drawings, head assembly 14 includes first and second substantially parallel, planar plates 20 and 22 of circular configuration in plan and provided with a number of elongated holes 24 and 26 corresponding to the number of legs 12. These holes 24 and 26 are elongated in configuration, and preferably are elliptical holes as illustrated, with these holes 24, 26 being arranged extending radially of the circular plates 20 and 22, respectively. Retaining the legs 12 within the holes 24, 26 is a C-shaped cotter pin 28 arranged in respective openings 30 provided in each of the legs 12 adjacent the ends of the legs 12 disposed within the holes 24, 26. By this arrangement, it can be appreciated that the legs 12 can pivot with respect to the plates 20, 22 due to the elongated configuration of the holes 24, 26, with the cotter pin 28 acting as a pivot pin for each of the legs 12.

The head assembly 14 further includes a fastener in the form of a conventional eyebolt 32 connected to and arranged extending between the plates 20 and 22 for holding the plates 20, 22 together. More specifically, the shank of eyebolt 32 passes through apertures appropriately provided within the plates 20, 22 such that the eye 34 of bolt 32 is disposed beneath plate 22, and the bolt 32 is retained on the plates 20, 22 as by the illustrated nuts 36 and 38. A conventional cotter pin 40 may be disposed in a suitable hole provided through the shank of eyebolt 32 in order to provide a safety feature in the event nut 36 should become loosened on the threads of bolt 32.

The support arrangement 16 includes a longitudinally extending, flexible element, such as chain 42, suspended from head assembly 14 as by the conventional single sheave block 44 and having a pair of longitudinally spaced ends. One of these ends is adjustably attached to one of the legs 12, while the grill 18 is removably attached to the other of the ends of the chain 42. As can be best seen from FIG. 4, a slide lock 46 including a planar element 48 of ovate configuration in plan is connected to the one of the ends of chain 42 and is provided with an aperture 50 suitably dimensioned so as to be slidably received on the associated one of the legs 12. The element 48 slides relative to leg 12 when the plane thereof is disposed substantially perpendicular to the longitudinal extent of the leg 12, but is locked against sliding movement relative to the associated leg 12 when the plane of element 48 is disposed at an angle substantially less than perpendicular to the longitudinal extent of the associated leg 12. Thus, adjustment of the vertical height of grill 18 can be made in a simple manner.

Grill 18 is essentially a planar, circular grill, with the support arrangement 16 further including at least three branches 52 disposed connected to and extending from the other of the ends of chain 42, with the connection being achieved as by the illustrated S-hook 54. Each of the branches 52 terminates at the ends thereof spaced from S-hook 54 in a conventional snap fastener 56 which engages the rim 58 of grill 18 at points on rim 58 substantially equally spaced around the circumference of grill 18.

Each of the legs 12 is illustrated as comprising a pair of telescoping sections 60 and 62. Suitable clamps 64, such as the illustrated thumb screws, are associated with the sections 60, 62 for releasably holding the sections 60, 62 in a desired relationship with respect to one another. More specifically, the thumb screw forming each clamp 64 is threadedly mounted in the larger section 60 so as to selectively grippingly engage the other of the sections 62 in a manner so as to prevent sliding movement of section 62 within the hollow section 60. By this arrangement, the basic length of the legs 12 can be adjusted together with the angle at which the legs 12 diverge from head assembly 14 in order to adjust the device 10 to a camp fire (not shown) of varying size and to permit the device 10 to be folded into a compact size for handling and storage merely by bringing the legs 12 into a substantially parallel disposition and sliding the section 62 of each leg 12 completely within the associated section 60.

As can be appreciated from the above description and from the drawings, an adjustable grill device according to the present invention provides a simple, yet rugged and reliable apparatus for cooking over an open fire, and the like, and enhances the enjoyment of outdoor cooking.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An adjustable grill device, comprising, in combination:
   (a) at least three coextensively arranged legs;
   (b) head means connected to the legs for disposing the legs in coextensive and adjustable relationship with respect to one another; and
   (c) support means mounted on the head means for suspending a cooking utensil beneath the head means, the head means including, in combination:
      (1) first and second substantially parallel, planar plates spaced from one another and provided with a plurality of matching holes, the number of holes being the same as the number of the legs, the legs being disposed in the holes for adjustment relative to the planes of the plates; and
      (2) retaining means disposed between the plates and engaging the legs for holding the legs in the holes provided in the plates.

2. A structure as defined in claim 1, wherein each of the legs is provided with an opening in a portion of the legs arranged between the plates, with the retaining means including a substantially C-shaped cotter pin arranged in the opening provided in the legs.

3. A structure as defined in claim 1, wherein the plates are circular plates and the holes are elongated holes substantially elliptical in plan and arranged extending radially of the plates.

4. A structure as defined in claim 1, wherein the head means further includes:
   (3) a fastener connected to and extending between the plates for holding the plates together.

5. A structure as defined in claim 4, wherein the fastener of the head means is an eyebolt having an eye disposed beneath the plates, with the support means including a longitudinally extending, flexible element having a pair of longitudinally spaced ends and suspended from the eye of the eyebolt, one of the ends of the flexible element being adjustably attached to one of the legs of the device, and the other of the ends of the flexible element being removably attachable by attachment means to a cooking utensil.

6. A structure as defined in claim 5, wherein the support means further includes a slide lock member including a planar element connected to the one of the ends of the flexible element and provided with an aperture slidably receiving the associated one of the legs, the associated one of the legs having a longitudinal extent, and the planar element sliding relative to the associated one of the legs when the plane of the planar element is disposed substantially perpendicular to the longitudinal extent of the associated one of the legs and being locked on the associated one of the legs when the plane of the planar element is disposed at an angle substantially less than perpendicular to the longitudinal extent of the associated one of the legs.

7. A structure as defined in claim 6, wherein the legs are each comprised by a pair of telescoping sections, and clamp means associated with the sections for releasably holding the sections in a desired relationship.

8. A structure as defined in claim 7, further including a cooking utensil, with the cooking utensil comprising a planar, circular grill having a peripheral rim, and the support means further including at least three branches connected at the other of the ends of the flexible element, the branches being releasably connected to the rim of the grill.

9. A structure as defined in claim 8, wherein each of the legs is provided with an opening in a portion of the legs arranged between the plates, with the retaining means including a substantially C-shaped cotter pin arranged in the opening provided in the legs.

10. A structure as defined in claim 1, wherein the legs are each comprised by a pair of telescoping sections, and clamp means associated with the sections for releasably holding the sections in a desired relationship.

11. A structure as defined in claim 1, further including a cooking utensil, with the cooking utensil comprising a planar, circular grill.

* * * * *